United States Patent [19]

Martens et al.

[11] Patent Number: 4,641,310
[45] Date of Patent: Feb. 3, 1987

[54] DATA PROCESSING SYSTEM IN WHICH UNRELIABLE WORDS IN THE MEMORY ARE REPLACED BY AN UNRELIABILITY INDICATOR

[75] Inventors: Theodorus G. J. A. Martens; Frits A. Steenhof; Johannes J. W. Kalfs, all of Eindhoven, Netherlands

[73] Assignee: U.S. Philips Corporation, New York, N.Y.

[21] Appl. No.: 666,710

[22] Filed: Oct. 31, 1984

[30] Foreign Application Priority Data

Nov. 2, 1983 [NL] Netherlands ........................ 8303765

[51] Int. Cl.⁴ ....................... G06F 11/10; G11C 29/00
[52] U.S. Cl. ....................................... 371/38; 371/13; 371/51
[58] Field of Search .............................. 371/13, 38, 51

[56] References Cited

U.S. PATENT DOCUMENTS

| | | | |
|---|---|---|---|
| 3,768,071 | 10/1973 | Krauft et al. | 371/51 |
| 3,780,271 | 12/1973 | Sharkitt et al. | 371/51 X |
| 4,037,091 | 7/1977 | Beuscher | 371/13 |
| 4,434,487 | 2/1984 | Rubinson et al. | 371/13 X |
| 4,441,184 | 4/1984 | Sonoda et al. | 371/38 X |
| 4,458,349 | 7/1984 | Aichelmann, Jr. et al. | 371/13 |

*Primary Examiner*—Charles E. Atkinson
*Attorney, Agent, or Firm*—Jack E. Haken; James L. Cannon, Jr.

[57] ABSTRACT

A data processing system comprising a memory receives data in the form of data blocks. Such a data block contains at least one data word and check bits. On the basis of the check bits it is vertified whether the data block contains reliable or unreliable data words. The unreliable data words are not written into the memory but are replaced by an unreliability indicator which is written into the memory at the address reserved for the unreliable dataword in question.

9 Claims, 4 Drawing Figures

DATA PROCESSING SYSTEM IN WHICH UNRELIABLE WORDS IN THE MEMORY ARE REPLACED BY AN UNRELIABILITY INDICATOR

BACKGROUND OF THE INVENTION

1. Field of the Invention

The invention relates to a data processing system, comprising a first data input for receiving data which is organized in data blocks, each data block containing at least one data word and check bits, said first data input being connected to an input of a verifier which serves to verify, under the control of the check bits, whether the data block contains reliable data, and to generate an unreliability signal when a data word does not contain reliable data, said first data input also being connected to a memory for the storage of data words.

2. Description of the Prior Art

A data processing system of this kind is known from GB No. 2,084,363. For each data block received, the verifier verifies, under the control of a check bit associated with that data block, whether the data block contains reliable or unreliable data. When the data block contains unreliable data, the verifier generates an unreliability signal. Under the control of this unreliability signal, the writing of that unreliable data block into the memory is prevented. Thus, only reliable data words are stored in a memory. The data processing system in accordance with said British Patent Application also comprises a separate error flag memory in which, each time when an unreliability signal is generated, an error flag is stored for the unreliable data word in question.

It is a drawback of the known data processing system that such a separate error flag memory is required for the storage of error flags each of which indicates that an unreliable data word has occurred in a data block, said unreliable data word not being stored in the memory. An error flag of this kind often consists of one bit and the data word consists of 8 bits. When the memory is, for example a 2K×8 bit RAM, the error flag memory would then comprise a 2K×1 bit RAM. This requires additional chip surface area or printed circuit board area. A 2K×8 bit RAM is a common commercial type but this implies that the 2K×1 bit RAM forms a separate memory which must be separately controlled, so that it requires additional energy and control means. The use of, for example, a specially designed 2K×9 bit RAM is undesirable for commercial applications because of the design and manufacturing costs.

SUMMARY OF THE INVENTION

It is an object of the invention to provide a data processing system in which the use of a separate memory for the indication of unreliable data words can be dispensed with.

To this end, a data processing system in accordance with the invention is characterized in that it also comprises a selection unit and a generator for generating an unreliability indicator, a first input of said selection unit being connected to the first data input, a second input being connected to an output of the generator, and a third input being connected to the verifier in order to receive the unreliability signal, an output of said selection unit being connected to a second data input associated with the memory, said selection unit being provided in order to block said first input under the control of an unreliability signal received and to substitute an unreliability indicator presented to the second input for the data word containing unreliable data.

Because the first input of the selection unit is blocked under the control of an unreliability signal, the unreliable data word is not written into the memory but is replaced by an unreliability indicator presented to the second input of the selection unit. Because the unreliability indicator is now written in the memory in the location of the unreliable word, it is no longer necessary to use a separate memory. When the memory is read, it is unambiguously indicated whether or not the data word read is reliable.

A first preferred embodiment of the data processing system in accordance with the invention is characterized in that the unreliability indicator has the same word length as the data word. Consequently, all bit locations at the relevant memory address are directly provided with bits without separate generators being required for this purpose.

A second preferred embodiment of the data processing system in accordance with the invention is characterized in that the unreliability indicator comprises an exception word. By using an exception word as an unreliability indicator, the risk, that a reliable data word which could otherwise correspond to the unreliability indicator so that it would incorrectly be deemed unreliable is substantially reduced to zero.

A further preferred embodiment of a data processing system in accordance with the invention is characterized in that a data word contains 8 bits, the unreliability indicator being formed by the data word 1000 0000. For example, in PCM audio the data word 1000 0000 corresponds to the full scale input range of the AD converter. This full scale input range hardly ever occurs, because severe distortion due to clipping occurs when this range is overstepped.

Another preferred embodiment of a data processing system in accordance with the invention is characterized in that the memory is of the small outline package type. Small outline package type memories are memories which occupy only very little chip surface area. When, moreover, a separate flag bit memory is saved by utilizing a data processing system in accordance with the invention, even more chip surface area is saved. Moreover, because this flat bit memory is omitted, no separate memory connections are required either for this memory, so that surface area is saved again. Furthermore, no separate addressing is required for the flag bit memory, which benefits the processing time.

The invention also relates to a method of writing data words into a memory which forms part of a data processing system, said method comprising the following steps:

(a) receiving a data word and check bits,
(b) verifying, under the control of the check bits, whether the data word contains reliable or unreliable data;
(c) writing the data word into the memory at an address specified for that data word after it has been verified that that data word contains reliable data.

Like the data processing system, such a method is also known from GB No. 2,084,363. The use of the known method necessitates the use of a separate error flag memory in order to indicate that a data word is unreliable. The drawback thereof has already been discussed with reference to the data processing system.

A method in accordance with the invention is characterized in that, when it has been verified that the data word contains unreliable data, the unreliable data word in question is replaced by an unreliability indicator which is written at the address specified for the data word in question.

Preferably, the writing of reliable data words into the memory is preceded by the writing of unreliability indicators, each reliable data word then erasing the unreliability indicator written at its specified address. In the case of, for example drop-outs or incorrect addressing, it is thus ensured that unreliability indicators are written in the memory instead of no data words (in the case of drop-outs) or instead of data words at an incorrect memory location (in the case of erroneous addressing).

BRIEF DESCRIPTION OF THE DRAWINGS

The invention will be described in detail hereinafter with reference to the drawings; therein.

DESCRIPTION OF THE PREFERRED EMBODIMENT

The invention can be used in any data processing system utilizing an indicator to indicate that a data word contains unreliable data. The invention will be described in detail hereinafter with reference to an embodiment in which the data processing system forms part of a PCM audio system according to the 8 mm video format. In PCM (pulse code modulation) audio according to the 8 mm video format, the data is transported in data blocks.

Figure 1:
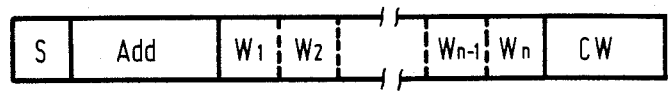
FIG. 1 shows an example of a data block in a PCM audio system according to the 8 mm video format.

FIG. 1 shows an example of such a data block. The first three bit positions contain the synchronization signal (S) for synchronizing the various data blocks in the data stream and the data words of a data block. The next 8 bits contain an address word (Add) for a location in a memory. The data words forming part of the data block in question are written into the memory, for example a RAM. The addressing of the memory is determined by means of the address word from the data block. The 80 subsequent bits comprise 10 8-bit words ($w_1$–$w_n$) which contain digitized audio data and/or error correction data. The next 16 bits (CW) contain check bits whose contents provide an indication concerning the correct reception of the data block. These check bits are generated, for example by means of a cyclic redundancy check (CRC) or other error detection code.

Figure 2:
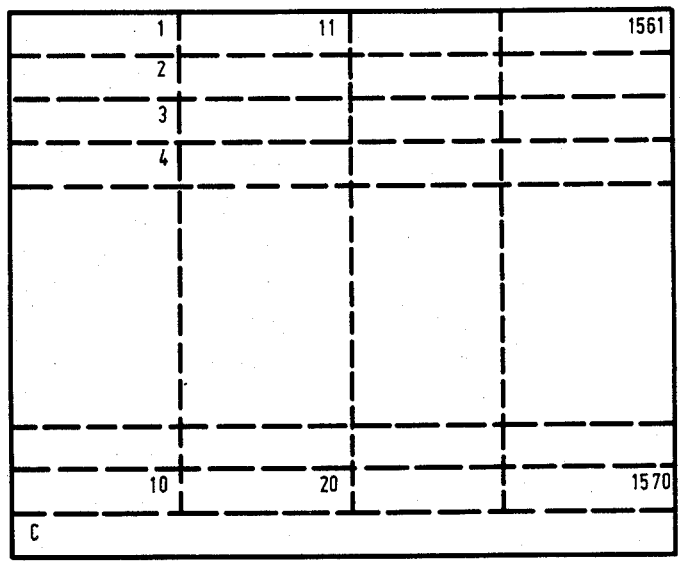
FIG. 2 shows an embodiment of a memory for the storage of data words.

FIG. 2 shows an embodiment of a memory at the receiving side of a digital audio system. Each of the numbers 1 to 1570 in the figure represents an octad or a group of 8 bits (one byte), thus representing a location in the memory for the storage of one data word. The memory thus has a capacity of 157×10 words. The words received are stored in the memory, the starting address being equal to the address forming part of the data block whereto the data words belonged. The memory also comprises space (C) for the storage of the check bits.

After the reception of at least one data block, the words forming part of the data block in question are checked as regards reliability. This is performed by means of the check bits which form part of the data block. For example, by utilizing the known cyclic redundancy check (CRC), it is determined for each 8-bit word of the data block whether it is reliable or not. This reliability indication per byte is necessary when use is made of an error correction algorithm which has a capability for error correction per word.

Once it has been established that the word checked is unreliable, in a device in accordance with the invention another well-defined 8-bit word is written at the memory address where the word in question would normally have been written. Said other well-defined 8-bit word now acts as an unreliability indicator and will be so referred to hereinafter. The same unreliability indicator is now used as a substitute for an unreliable word. In principle it is possible to select an arbitrary one of the $2^8$ feasible 8-bit data words as the unreliability indicator. However, preferably an exception word is selected. An exception word is a word which is extremely rare or even absent in the data stream. The reasons for this will be discussed hereinafter. For use in PCM audio in conformity with the 8 mm video format the 8-bit word "1000 0000" is a suitble choice for the unreliability indicator. This is because this value corresponds to the full scale input range of the DA converter (digital-to-analog converter which translates the digital audio signal into an analog audio signal). However, this value will only rarely occur in the audio data, because a very severe distortion due to clipping occurs when this range is overstepped.

Figure 3:
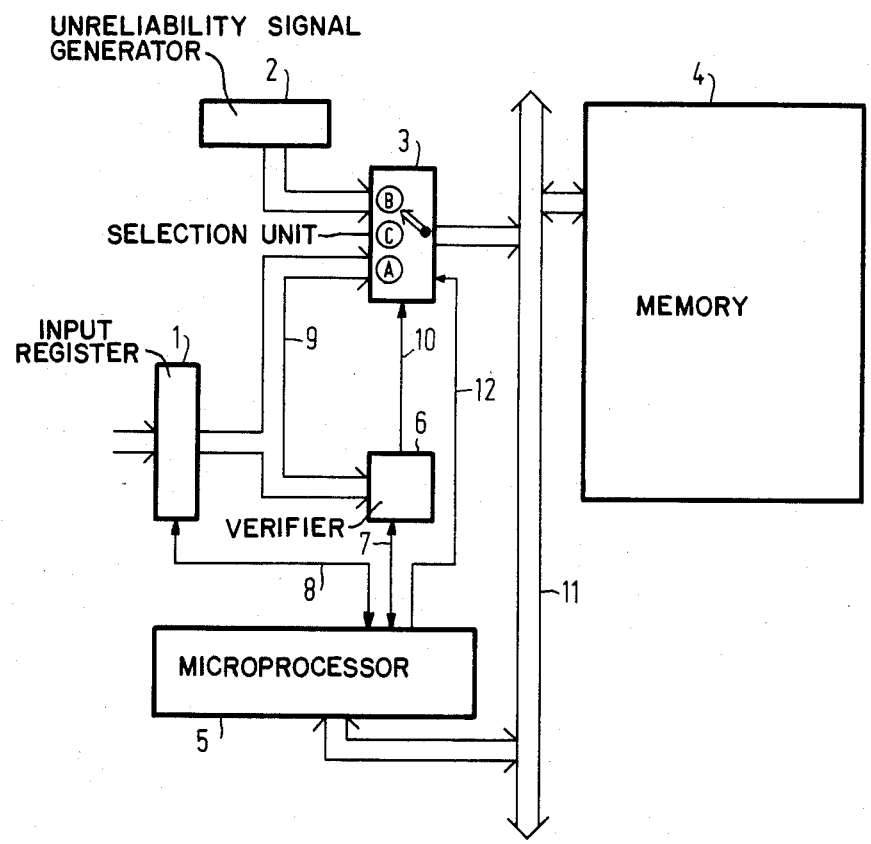
FIG. 3 shows an embodiment of a device for substituting an unreliability indicator for an unreliable data word.

FIG. 3 shows an embodiment of a device in accordance with the invention for substituting an unreliability indicator for unreliable words. This device comprises an input register 1 having an output which is connected, via a bus 9, to a first input A of a selection unit 3, as well as to an input of a verifier 6. A second input B of the selection unit is connected, via a bus, to output of a generator 2 for generating an unreliability indicator. An output of the selection unit is connected to a memory 4, for example a RAM, which is the memory situated at the receiving side of the digital audio system. The device is controlled by means of a data processor unit 5, for example a microprocessor. The microprocessor and the verifier exchange control data via a line 7. The selection unit 3 is controlled on the one hand by the verifier which for this purpose is connected to the selection unit via the line 10, and on the other hand by the microprocessor which is connected to the selection unit via the line 12. Control data is transported on line 8 between the input register 1 and the microprocessor. The memory 4 and microprocessor 5 communicate via the system bus 11 on which data and addresses are transported.

When a data block originating from a data source (not shown in the figure), for example an 8 mm video tape is presented to the device, the data block in question is temporarily stored in the input register 1. Via the line 8, the microprocessor is informed that a data block has been stored in the input register. The microprocessor then generates a first control signal which is applied, via the line 7, to the verifier 6 which is thus activated. As is customary in CRC, the verifier determines the redundancy from the data block and compares it with the added redundancy from the check bits forming part of the data block. When both redundancies correspond, the verified word is indicated as being a reliable word, or otherwise as an unreliable word.

While the verifier checks the reliability of the words received as well as during the period during which no words originating from the input register are written into the memory 11, the input (B) is connected to the output of the selection unit under the control of a second control signal which is generated by the microprocessor and which is applied to the selection unit via the line 12. Consequently, the output of the generator 2 is connected to a data input of the memory so that unreliability indicators are written into the memory. The unreliability indicators are written in locations which succeed the last data word written and in which, moreover, no relevant data is present. The microprocessor memorizes the position occupied by the address pointer at the instant at which the writing of unreliability indicators commences. The writing of unreliability indicators is interrupted when the microprocessor is informed, via the line 7, that the verifier has completed its task for the data block received. Via a third control signal which is generated by the microprocessor, the input (B) of the selection unit is uncoupled from the output. The microprocessor memorizes at which addresses in the memory unreliability indicators have been written and sets the address pointer to the address as indicated by the address forming part of the data block presented.

For the words which form part of the data block received, the verifier has thus determined whether they are reliable or unreliable words. During the writing of words from the data block received, the selection unit 3 is controlled by means of selection signals which are generated by the verifier and which are applied to the selection unit via the line 10. When a reliable word is concerned, the input (A) is connected to the output of the selection unit. Consequently, the reliable word in question is written into the memory in the location indicated by the associated address. The unreliability indicator already present in this location is erased by the reliable word. However, if the word is unreliable, the position (C) of the selection unit is chosen under the control of a selection signal from the verifier. In this position no new data is applied to the memory. Consequently, in the location where normally the unreliable word would have been written, the unreliability indicator already present remains.

Evidently, it is alternatively possible to refrain from filling the memory with unreliability indicators in advance; instead, whenever an unreliable word is detected by the verifier, the verifier can be made to generate a selection signal which switches the selection unit to the position (B). However, preferably the first method is used. This is because this first method offers the advantage that, in the case of drop-outs or incorrect addressing, unreliability indicators are still written in the correct memory location.

Let us assume that a drop-out has occurred in the incoming data blocks. This means that no data words are presented, so that no data words can be written into the memory. However, using the former method unreliability indicators are then written into the memory locations concerned.

When the address is incorrect, the data words are written at incorrect memory locations. The data words written at incorrect memory locations will probably be erased by subsequent data words from the data stream while, if no use is made of the former method, the memory locations where the data words would normally have been written would remain empty. However, when said method is used, these memory locations are then filled with unreliability indicators.

The writing of unreliability indicators instead of unreliable words, of course, also has consequences for the reading of the words stored in the memory 4.

Figure 4:
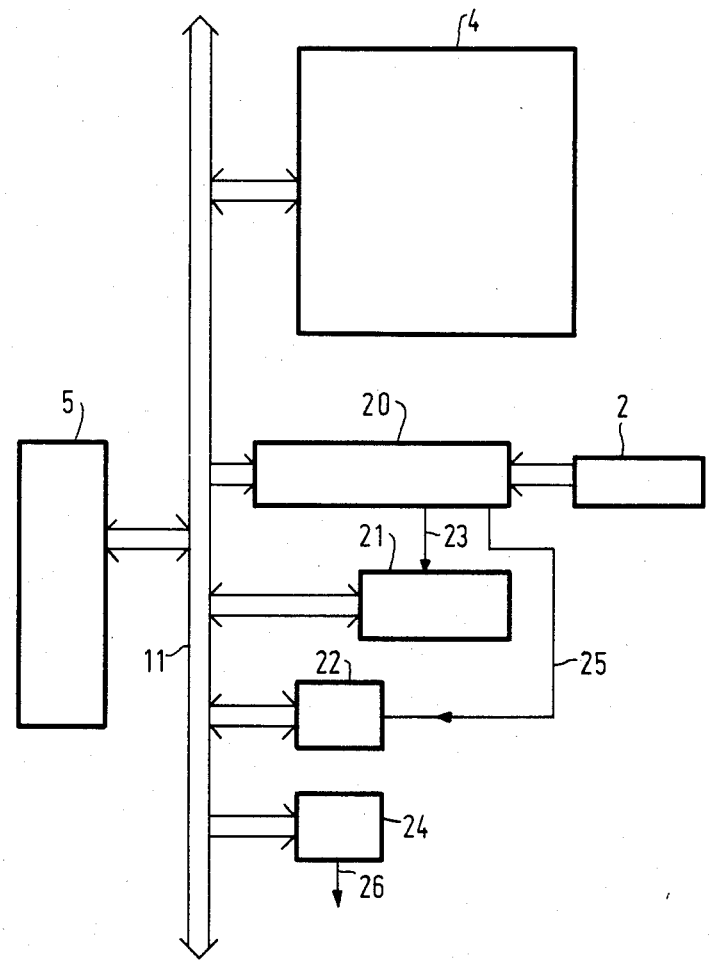
FIG. 4 shows an embodiment for the reading of a memory in which unreliability indicators have been substituted for unreliable data words.

FIG. 4 shows an embodiment of a device for reading and correcting data words from a memory in which an unreliability indicator is written instead of unreliable words. The memory 4, the generator 2, the microprocessor 5 and the bus 11 are identical to the corresponding components illustrated in FIG. 3. A first input of a comparison unit 20 is connected to the bus 11 while a second input is connected to an output of the generator 2 for an unreliability indicator. Also connected to the bus 11 is a corrector 22, an interpolator 21 and a D/A (digital-to-analog)converter 24.

Each word read from the memory 4 is applied to the comparison unit 20 in order to be compared with the unreliability indicator generated by the generator 2. There are two possibilities:
(1) the word read is not the same as the unreliability indicator;
(2) the word read is the same as the unreliability indicator.

These two possibilities will now be separately described.
(1) When the word read from the memory 4 is not the same as the unreliability indicator, a reliable word is concerned. In that case the corrector 21 is not activated. The reliable word remains in the memory in unmodified form.
(2) When the word read from the memory 4 is the same as the unreliability indicator, an unreliable word has been replaced by an unreliability indicator during the write operation. This means that a correction or possibly interpolation is necessary. The comparison unit 20, having detected correspondence between the word read and the unreliability indicator, now generates a control signal which is applied to the corrector 21 via the line 23. Under the control of this control signal, the corrector attempts in known manner, for example by utilizing an algorithm, to produce a reliable word for the relevant unreliability indicator in order to write this reliable word into the memory instead of the unreliability indicator. However, if the corrector cannot successively perform this correction operation, the unreliability indicator remains in the memory.

When the content of the memory is fetched in order to convert the data words stored into audio signals, the reliable data words are translated by the D/A converter into an analog audio signal which is outputted on an output 26.

Any unreliability indicator in the data stream on the bus is detected by the comparison unit. Upon detection of an unreliability indicator, the comparison unit generates a control pulse which is applied to the interpolator 22 via the line 25. Under the control of this control pulse, the interpolator interpolates a substitute word for the unreliable word in known manner. The substitute word replaces the unreliability indicator in the data stream on the bus 11. The D/A converter subsequently translates the substitute word in question into an analog audio signal.

Because use is made of an unreliability indicator in the form of a word which could possibly belong to the data stream, the possible effect thereof on the processing of the data stream by the device will now be described. Two cases can be distinguished:

(a) the word used as the unreliability indicator does not occur in the stream of words to be written into the memory. In any location where an unreliability indicator is written, it will thus actually form a substitute for an unreliable word. During the read operation, the unreliable word will be corrected and, if necessary interpolated;

(b) the word use as the unreliability indicator also occurs in the stream of words to be written into the memory. However, this word is then incorrectly deemed to be an unreliable word. However, if the capacity of the correction system is not exceeded, this word will be corrected to itself. Consequently, the correction has no audible effect whatsoever on an audio signal. However, if the capacity of the correction system is exceeded (this capacity amounts to, for example one word per data block), an interpolation operation is performed for this word, so that the effect on an audio signal will be hardly audible.

Preferably, use is made of a word which only rarely occurs in the stream of words, so that the above case (b) also hardly ever occurs.

The memory is preferably of the small outline package type (for example, HITACHI HM 6116 LFP). Small outline package type memories are memories which occupy only little chip surface area. In addition to the saving of a separate flag bit memory, the use of a small outline package memory also saves an additional amount of chip surface area.

What is claimed is:

1. In a data processing system comprising
   data input means connected to receive blocks of data, wherein each data block contains at least one data word and check bits,
   a data verifier,
   means connecting said data input means to an input of the verifier, the verifier comprising means responsive to the check bits of a received data block for verifying whether the data block contains reliable data, and for generating an unreliability signal when the received data word does not contain reliable data,
   a memory, and
   means coupling said data input means to said memory for the storage of data words therein;
   the improvement wherein the means coupling the data input means to the memory comprises a selection unit, and further comprising a generator for generating an unreliability indicator,
   said selection unit having a first input connected to the data input means, a second input connected to receive the unreliability indicator from the generator, and an output coupled to said memory,
   said selection unit comprising means responsive to said unreliability indicator for blocking said first input from said memory and for substituting an unreliability indicator at said second input for the data word portion of a data block that contains unreliable data,
   whereby data words stored in said memory and corresponding to unreliable data words received at said first input means are comprised of said unreliability indicator.

2. The data processing system of claim 1 wherein said unreliability signal generator comprises means for generating, as said unreliability indicator, a word with the same length as said data word.

3. The data processing system of claim 1 wherein said unreliability signal generator comprises means for generating, as said unreliability indicator, a word that is unlikely to occur as a reliable data word.

4. The data processing system of claim 1 wherein said unreliability signal generator comprises means for generating, as said unreliabililty indicator, the word 1000 0000.

5. The data processing system of claim 1 wherein said system is a PCM audio system.

6. In a data processing system comprising
   data input means connected to receive blocks of data, wherein each data block contains at least one data word and check bits,
   a data verifier,
   means connecting said data input means to an input of the verifier, the verifier comprising means responsive to the check bits of a received data block for verifying whether the data block contains reliable data, and for generating an unreliability signal when the received data word does not contain reliable data,
   a memory, and
   means coupling said data input means to said memory for the storage of data words therein;
   the improvement wherein the means coupling the data input means to the memory comprises a selection unit, and further comprising a generator for generating an unreliability indicator,
   said selection unit having a first input connected to the data input means, a second input connected to receive the unreliability indicator from the generator, and an output coupled to said memory,
   said selection unit comprising means responsive to said unreliability indicator for blocking said first input from said memory, whereby data words applied to said memory may be selectively derived from said first input and said generator and data words stored in said memory and corresponding to unreliable data words received at said first input means are comprised of said unreliability indicator.

7. In the method of writing data words into a memory which forms part of a data processing system comprising the steps:
   receiving a data word and check bits;
   verifying, under the control of the check bits, whether the data word contains reliable or unreliable data; and
   writing the data word into the memory at an address specified for that data word after it has been verified that the data word contains reliable data;
   the improvement comprising substituting the unreliable data word by an unreliability indicator at the address specified for the data word in question when it has been verified that a data word contains unreliable data.

8. The method of claim 7 wherein said step of substituting comprises substituting said unreliable data word with an unreliability indicator of the same length as said unreliable data word.

9. The method of claim 8 wherein said step of substituting comprises writing said unreliabiity indicator at a plurality of addresses of said memory at which data words are to be stored before said step of writing, and said step of writing comprises writing reliable data words at respective addresses of said memory to erase unreliability indicators stored thereat.

* * * * *